United States Patent Office 3,813,284
Patented May 28, 1974

3,813,284
FIBROUS VIBRATION PLATE FOR LOUDSPEAKER AND PRODUCTION THEREOF

Yasuhiro Miki, Kawagoe, and Tadaki Kumanogo, Tokorozawa, Japan, assignors to Pioneer Electronic Corporation, Tokyo, Japan
Filed Apr. 19, 1972, Ser. No. 245,338
Claims priority, application Japan, Apr. 23, 1971, 46/26,078
Int. Cl. D21j 3/00
U.S. Cl. 162—219                                5 Claims

ABSTRACT OF THE DISCLOSURE

A vibration plate for a loudspeaker having an edge portion integral therewith is produced in such a manner that a first ply having a flanged edge portion and a central conical portion and made into uniform thickness is fabricated by forming a first ply in a first mold comprising a molding portion of a configuration substantially equal to that of the vibration plate and provided with a number of suction holes evenly distributed over the molding portion, and a wire net extended along the entire area of the molding portion. A second ply having a mere conical portion and made into a uniform thickness is secondly fabricated in a second mold comprising a molding portion of a configuration substantially equal to that of the first mold but the suction holes being distributed over a mere portion thereof corresponding to the conical portion of the vibration plate, and a wire net extended along the entire area of the molding portion. Then the first ply and the second ply are combined into an integral vibration plate by means, for instance, of a heating press.

BACKGROUND OF THE INVENTION

This invention relates to a made paper vibration plate for a loudspeaker, and more particularly to a construction and production of a vibration plate wherein the edge portion is formed integral with the main center portion of the vibration plate.

Heretofore, vibration plates wherein the edge portion is formed integral with the main portion have been produced by a mold employing a wire net dipped into a pulp suspended solution. The mold comprises a molding portion of a configuration substantially equal to that of the vibration plate to be produced, an annular wall portion provided at a location corresponding to an intermediate circle between the conical portion and the edge portion of the vibrating plate, and a frame portion of the mold encasing the whole of the above-mentioned two portions, as hereinafter disclosed in more detail. In the molding portion, a great number of suction holes are bored, and in the annular wall portion, suction holes of a number far less than that of the molding portion are bored. When a mold of the above-mentioned construction is placed in the pulp solution together with a wire net also formed into a configuration substantially equal to that of the vibration plate to be produced, and when the mold and the wire net are raised slowly while the solution is drawn through a bottom hole of the mold, the fibers of the pulp suspended in the solution are collected on the wire net to a desired thickness. Since the number of the holes bored through the annular wall portion is far less than that of the holes bored through the molding portion of the mold, the quantity of the solution drawn through a portion of the molding portion corresponding to the edge portion of the vibrating plate is less than that through the remainder portion of the mold, whereby the thickness of the fiber layer deposited on the edge portion is less than that of the conical portion of the vibration plate. The fibers thus deposited on the wire net in the above described conventional practice have been thereafter removed from the wire net and dried out in a heating press so that a vibration plate having an edge portion integral with the rest of the plate is thereby obtained.

However, the vibration plates thus produced have been found to have drawbacks in that an irregularity in thickness is caused within the edge portion of the vibration plate, which in turn creates a deviation in the lowermost tuning frequency of a speaker using the vibration plate, and also the reproduction of the bass range is not sufficiently achieved because of the fact that no ample difference is provided between the thicknesses of the conical portion and the edge potrion of the vibration plate.

SUMMARY OF THE INVENTION

Therefore, a primary object of the present invention is to provide a vibration plate and a method for producing the vibration plate whereby uniform thicknesses of the edge portion and the conical portion can be achieved and the irregularity in the lowermost resonance freqeuncy band can be thereby prevented.

Another object of the invention is to provide a vibration plate and a method for producing the vibration plate whereby the thickness of the edge portion in comparison with that of the conical portion thereof can be varied to the desired degree, and the reproduction characteristics of the bass range can be thereby substantially improved.

Still another object of the invention is to provide a vibration plate and a method for producing the vibration plate in which the conical portion is made into two plies combined together, one of the plies being made of different material from the other, whereby the vibration plate is adapted to be operated in all of the bass, medium tone, and treble ranges.

The first part of the above described and other objects of the present invention can be achieved by a vibration plate comprising a first ply of a vibration plate having a uniform thickness and including an edge portion and a conical portion, and a second ply of a vibration plate having another uniform thickness and including a mere conical portion, both plies being combined together into a unitary vibration plate.

The second part of the above described and other objects of the present invention can be achieved by a method for producing the vibration plate comprising the steps of providing a first ply of the vibration plate of a uniform thickness and including an edge portion and a conical portion by means of a first mold which is so constructed that the suction of a pulp suspended liquid through portions of the mold corresponding to the edge and conical portions of the vibration plate can be achieved in a uniform manner, producing a second ply of the vibration plate of a uniform thickness and having a mere conical portion by means of a second mold which is so constructed that no suction of the liquid is provided through the mold portion corresponding to the edge portion of the vibration plate but a uniform suction is provided for the portion of the mold corresponding to the conical portion of the vibration plate, and combining the first and second plies by pressing them together in nested fashion under a heated condition.

The nature, principle, and utility of the present invention will be better understood from the hereinafter described detailed description of the invention when read in conjunction with the accompanying drawings.

DETAILED DESCRIPTION OF THE INVENTION

As conducive to a full understanding of the present invention, a conventional practice for producing a vibration plate will be first described with reference to FIG. 1.

Figure 1:
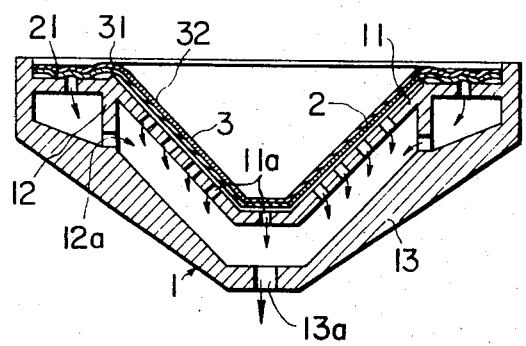
FIG. 1 is a sectional view of a mold taken along a plane passing through the center, which is employed for the purpose of explaining a conventional practice for producing a vibration plate.

In FIG. 1, a mold generally designated at 1 comprises a molding portion 11 of a shape substantially identical to that of the vibration plate 3 to be produced, an annular separating wall 12 formed at a position corresponding to an intermediate circle between the conical portion and the edge portion of the vibration plate, and a frame portion 13 encasing the whole of the two portions 11 and 12 of mold 1.

In the molding portion 11 of the mold 1, a great number of suction holes 11a are bored, and in the annular wall portion 12, suction holes 12a of a number far less than that of the molding portion 11 are bored. When a mold of the above described construction is placed in a pulp suspended solution together with a wire net 2 of a shape also identical to that of the vibration plate 3 and placed on the molding portion 11 of the mold 1, and when the mold 1 and the wire net 2 are lifted upward slowly while the solution is drawn through a bottom hole 13a of the mold frame 13, the fibers of the pulp suspended in the solution are collected on the wire net 2 to form a layer of a desired thickness, and only the liquid component of the solution is drawn through the holes 11a, 12a, and 13a.

In this case, since the number of holes 12a bored through the annular wall 12 of the mold 1 is far less than that of the holes 11a bored through the molding portion 11, the quantity of the solution drawn through the portion corresponding to the edge portion of the vibration plate is less than that passing through the portion of the molding surface corresponding to the conical portion of the vibration plate, the thickness of the fiber layer deposited on the wire net 2 corresponding to the edge portion of the vibration plate is far less than that of the portion corresponding to the conical portion of the vibration plate.

The fiber layer thus deposited on the wire net 2 is then removed from the wire net 2 and dried out in a heating press so that a vibration plate having an edge portion integral with the rest of portions can be obtained.

However, the vibration plate thus produced is disadvantageous in that an irregularity in thickness is caused in the edge portion of the vibration plate, which in turn creates a deviation in the lowermost tuning frequency of a speaker employing the vibration plate, and the reproduction in the bass range is of insufficient strength because no ample difference can be provided between the thicknesses of the conical portion and the edge portion of the vibration plate.

The above described drawbacks of the conventional practice can be substantially eliminated by a novel construction of the vibration plate and a method for producing the vibration plate which will be described with reference to FIGS. 2 through 4.

According to the present invention, a vibration plate is made of a first ply and a second ply which are thereafter bonded together by means of a heat press. The first ply is made in a first mold 4, as shown in FIG. 2, which comprises a molding portion 41 formed to be identical to the configuration of the first ply 51 and a frame portion 42 encasing the molding portion 41 and having a bottom hole 42a connected to a suction pump (not shown). The molding surface 41 is provided with suction holes 41a and 41b evenly distributed over the conical portion and the edge portion, respectively.

Over the entire surface of the molding portion 41, a wire net 6 of a configuration identical to that of the vibration plate 51 is extended, and the peripheral edge of the wire net 6 is held between a pair of supporting pieces 7, 7.

Figure 2:
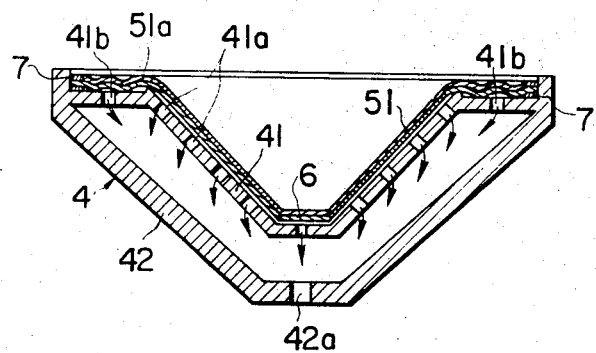
FIGS. 2 through 4 are sectional views of molds taken along a plane passing through the center, which is employed for producing a vibration plate according to the present invention.
Figure 3:
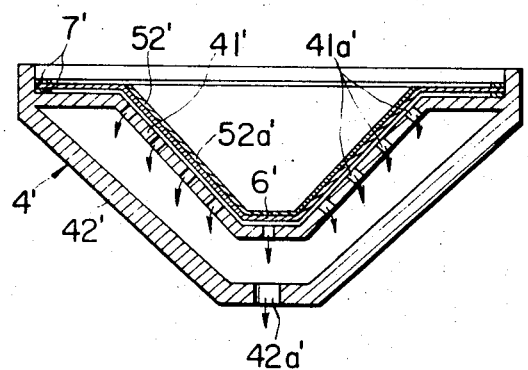

The second ply 52 is made in a second mold 4', as shown in FIG. 3, which comprises a molding portion 41' formed to be identical to the configuration of the second ply 52, and a frame portion 42' identical to that shown in FIG. 2 and having a bottom hole 42a' connected to a suction pump (not shown). In the molding portion 41', a great number of suction holes 41a' are bored to be evenly distributed over a portion thereof corresponding to the conical portion of the vibration plate. However, it should be noted that in the second mold 4', there are no suction holes similar to those at 41b in FIG. 2, in the portion corresponding to the edge portion of the vibration plate. Over the entire surface of the molding portion 41', there is extended a wire net 6' substantially similar to the wire net 6 in FIG. 2 but the peripheral edge portion thereof is made flat, and the wire net 6' is held to its position by means of a pair of supporting pieces 7', 7' as in the case of FIG. 2.

Figure 4:
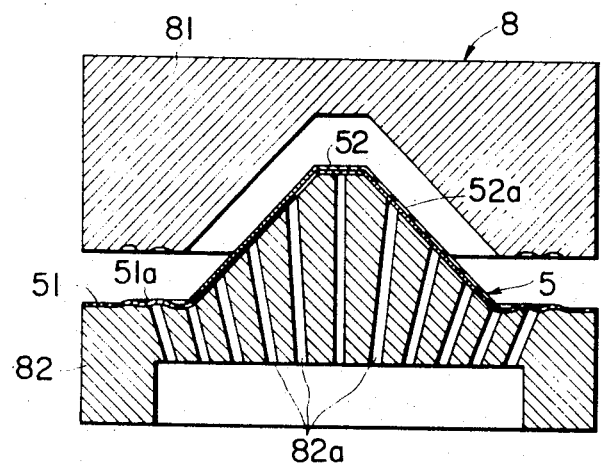

In FIG. 4, there is illustrated a heat press 8 comprising an upper mold 81 and a lower mold 82. The inner surfaces of the upper mold 81 and the lower mold 82 are shaped identically to the configuration of the vibration plate 5, and a great number of suction holes 82a are bored through the lower mold 82. The suction holes 82a are thereafter connected to, for instance, a pump (not shown), and any dampness of water contained in the vibration plate is drawn through the suction holes 82a.

A method for producing the vibration plate employing the first and second molds and also the heating press will now be described.

The first mold is placed into a pulp suspended solution together with the wire net, and gradually the mold and net combination is lifted upward while the solution is sucked through the holes by employing, for instance, a pump. As a result, a uniform layer of pulp fibers is deposited on the wire net 6 so that a first ply of the vibration plate as denoted by 51 in FIG. 2 can be obtained. It should be noted that the first ply of the vibration plate has an edge portion integrally formed therewith, and since the sucking holes 41a and 41b are bored through the molding portion 41 of the first mold 4 in a uniformly distributed manner, the thickness of the first ply 51 of the vibration plate thus formed will be substantially constant throughout the whole area of the first ply.

Likewise, the second mold 4' is placed into the same or another pulp solution together with the wire net 6', and the mold and net combination is thereafter lifted slowly while the solution is drawn through the suction holes 41a' and the bottom hole 42a, by employing, for instance, a pump. By this procedure, a layer of fibers is formed on the wire net 6', and since there have been provided no suction holes like those at 41b in FIG. 2 in the peripheral portion of the mold 4', a mere conical portion 52a is formed for the second ply of the vibration plate.

The first and second plies of the vibration plate are thereafter removed from the wire nets 6 and 6', respectively, and the first and second plies are placed in this sequence on the inner surface of the lower mold 82 of the heat press 8 so that the first ply is placed underneath the second ply. Then the upper mold 81 of the heat press 8 is placed over the lower mold 82, and both the plies are pressed under a heated condition. During the above described process, any dampness or water remaining in the two piles is drawn out through the suction holes 82a, and ultimately the two plies are bonded together into a unified structure of the vibration plate 5.

If it is desired, an ordinary or gloiopeltis glue or casein may be added in the above described pulp suspended solution, so that the bonding action between the two plies can be further enhanced. When it is desired to control the hardness of the vibration plate, the plate can be hardened by an addition of a carboxymethyl cellulose, or it may be softened by an addition of a polyvinyl alcohol.

It should be noted that the first ply and the second ply employed in the present invention may be made of the same material or different materials. Accordingly, vibration plates of various characteristics can be made in accordance with the requirements for the loudspeakers.

Since the vibration plate according to the present invention is made by combining a first ply having a conical portion and a flanged edge portion with a second ply having only a conical portion under the operation of a heat press, the thickness of the edge portion can be made far less than that of the resulting conical portion, whereby the reproduction of a bass range can be carried out with an extreme fidelity.

Furthermore, the thicknesses of the edge portion and the conical portion can be made uniform with an extreme precision, so that the lowermost resonance frequencies of the vibration plates can be substantially equalized.

What is claimed is:

1. A method for producing a vibration plate for a loudspeaker comprising the steps of providing a first ply of the vibration plate of a uniform thickness and including a flanged edge portion and a conical portion by means of a first mold which is so constructed that the suction of a pulp suspended liquid through portions of the mold corresponding to the edge and conical portions of the vibration plate can be achieved in a uniform manner, producing a second ply of the vibration plate of a uniform thickness and having a mere conical portion by means of a second mold which is so constructed that no suction of the liquid is provided through the mold portion corresponding to the edge portion of the vibration plate but a uniform suction is provided for the portion of the mold corresponding to the conical portion of the vibration plate, and combining the first and second plies by pressing them together in nested fashion under a heated condition.

2. A method for producing a vibration plate as set forth in claim 1, wherein said first mold comprises a molding portion provided with a number of suction holes evenly distributed over the entire area of the molding portion, and a frame portion encasing the molding portion and having a bottom hole connected to a suction member.

3. A method for producing a vibration plate as set forth in claim 1, wherein said second mold comprises a molding portion provided with a number of suction holes evenly distributed over a mere portion of the molding portion corresponding to the conical portion of the vibration plate, and a frame portion encasing the molding portion and having a bottom hole connected to a suction member.

4. A method for producing a vibration plate as set forth in claim 1, wherein a wire net of a configuration equal to that of the vibration plate is extended over the entire surface of the molding portion of the first mold, and a wire net substantially equal to said wire net but whose peripheral edge portion thereof is made flat is extended over the entire surface of the molding portion of the second mold.

5. A method for producing a vibration plate as set forth in claim 1, wherein said first ply and second ply are heat pressed into an integral vibration plate.

References Cited

UNITED STATES PATENTS

| | | | |
|---|---|---|---|
| 2,411,066 | 11/1946 | Stevens | 116—219 X |
| 1,984,018 | 12/1934 | Hawley | 162—219 |
| 2,321,574 | 6/1943 | Chaplin | 162—219 |
| 2,460,129 | 1/1949 | Ista | 162—219 X |
| 1,952,169 | 3/1934 | Hawley | 162—219 X |
| 1,952,168 | 3/1934 | Hawley | 162—219 X |
| 2,377,864 | 6/1945 | Chaplin | 162—219 |
| 3,253,970 | 5/1966 | Williams | 162—382 X |

S. LEON BASHORE, Primary Examiner

R. H. TUSHIN, Assistant Examiner

U.S. Cl. X.R.

162—224, 383, 416